United States Patent
Ikeuchi (10) Patent No.: US 7,603,489 B2
(45) Date of Patent: Oct. 13, 2009

(54) DIRECT MEMORY ACCESS CONTROLLER INCLUDING FIRST AND SECOND TRANSFER SETTING REGISTERS

(75) Inventor: Toru Ikeuchi, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 228 days.

(21) Appl. No.: 11/802,051

(22) Filed: May 18, 2007

(65) Prior Publication Data

US 2008/0005389 A1 Jan. 3, 2008

(30) Foreign Application Priority Data

May 19, 2006 (JP) ............................. 2006-140687

(51) Int. Cl.
*G06F 13/28* (2006.01)
(52) U.S. Cl. ............................. 710/22; 710/23; 710/26; 710/28
(58) Field of Classification Search ...................... None
See application file for complete search history.

(56) References Cited

U.S. PATENT DOCUMENTS 6,202,106 B1 *  3/2001  Baxter ......................... 710/22
6,701,405 B1 *  3/2004  Adusumilli et al. ......... 710/308

FOREIGN PATENT DOCUMENTS

| JP | 8-278938 | 10/1996 |
| JP | 2000-20455 | 1/2000 |

* cited by examiner

*Primary Examiner*—Alan Chen
(74) *Attorney, Agent, or Firm*—McGinn IP Law Group, PLLC (57) ABSTRACT

DMAC includes current transfer setting registers and next transfer setting registers. Each of the current transfer setting registers stores transfer source address, transfer destination address and transfer count. The next transfer setting registers stores a transfer setting of a DMA transfer carried out after completing a DMA transfer according to a current transfer setting stored in the current transfer setting registers as a next transfer setting. Further, flags are provided for controlling to write to each of the next transfer setting registers.

20 Claims, 6 Drawing Sheets

RELATED ART

Fig. 6

RELATED ART

Fig. 7

DIRECT MEMORY ACCESS CONTROLLER INCLUDING FIRST AND SECOND TRANSFER SETTING REGISTERS

BACKGROUND OF THE INVENTION

1. Field of the Invention

The present invention relates to a direct memory controller (DMAC) for transferring data between a memory and peripheral device.

2. Description of the Related Art

Information processing apparatuses including a personal computer and workstation generally use a DMA transfer method for transferring data between a main memory and peripheral device. In the DMA transfer method, a request for data transfer to a DMAC from CPU (Central Processing Unit) means that the DMAC controls the data transfer between a main memory and peripheral device. Accordingly the CPU does not need to concern the data transfer and is able to perform other processes.

Figure 6:
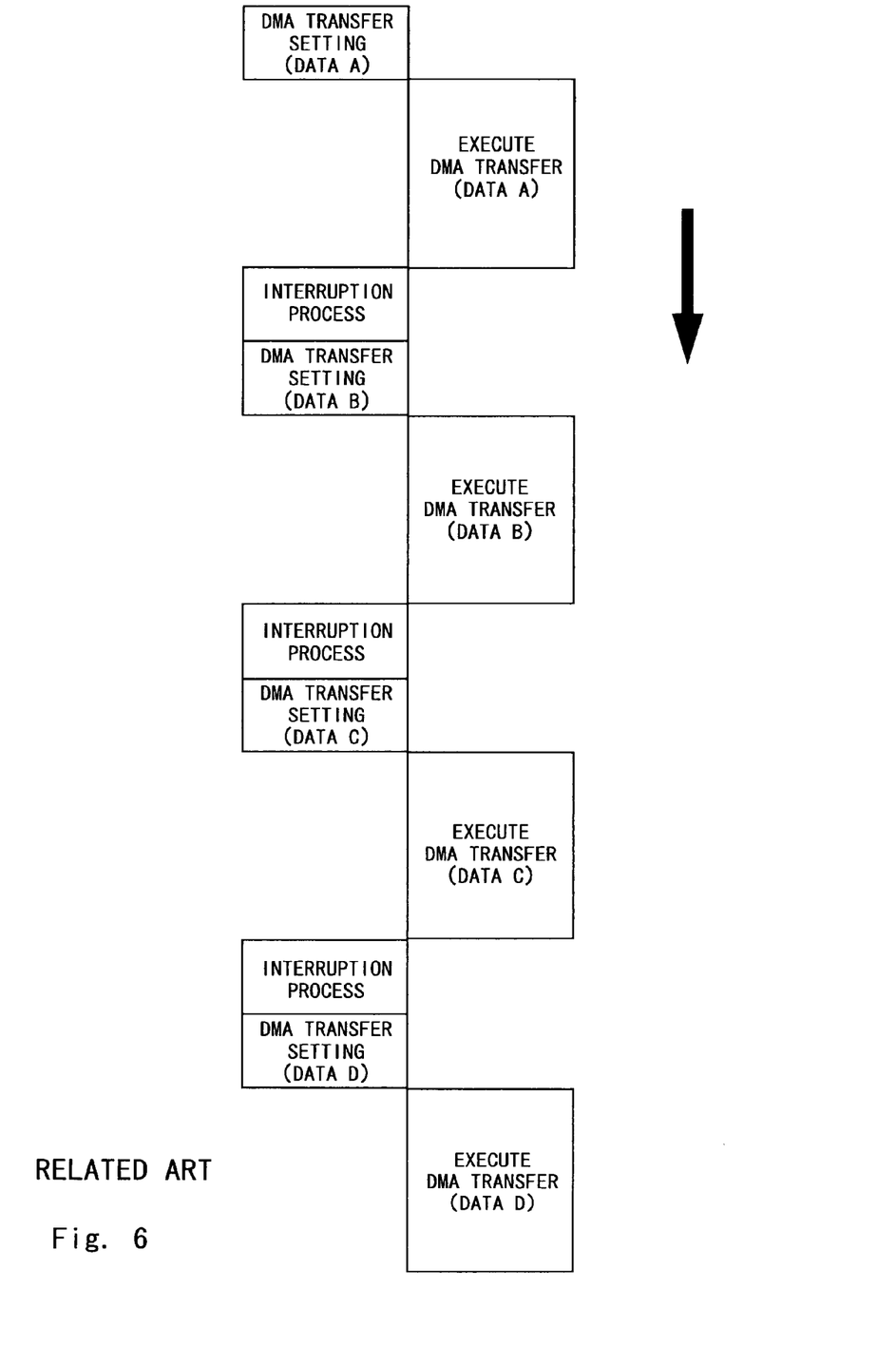
FIG. 6 is a timing chart showing an operation example of a conventional DMAC.

FIG. 6 is a timing chart showing a flow of an operation example by CPU and DMA in a conventional DMA transfer apparatus. The direction indicated by the arrow in the drawing refers to a time axis of the processes. Further, "DMA transfer setting" and "interruption process" are performed by CPU and "DMA transfer setting" is performed by DMAC.

As shown in the timing chart of FIG. 6, before starting a DMA transfer, a memory start address and data transfer count are configured. After completing the DMA transfer corresponding to the content configured, a memory start and data transfer count for a next DMA transfer are configured. In such DMA transfer apparatus, the next DMA transfer setting cannot be configured until the data currently being transferred is completed, thereby generating problems that the CPU is overloaded and the processes cannot be carried out at high-speed.

A method is suggested for preventing configurations for the abovementioned DMA transfer from being concentrated on particular time so as to relieve the load on the CPU (see Japanese Unexamined Patent Application Publication No. 8-278938 and Japanese Unexamined Patent Application Publication No. 2000-20455).

According to the method, a DMAC includes two setting registers so that during a DMA transfer according to a DMA transfer setting stored in a first setting register, setting for a second DMA transfer can be configured to another setting register.

Figure 7:
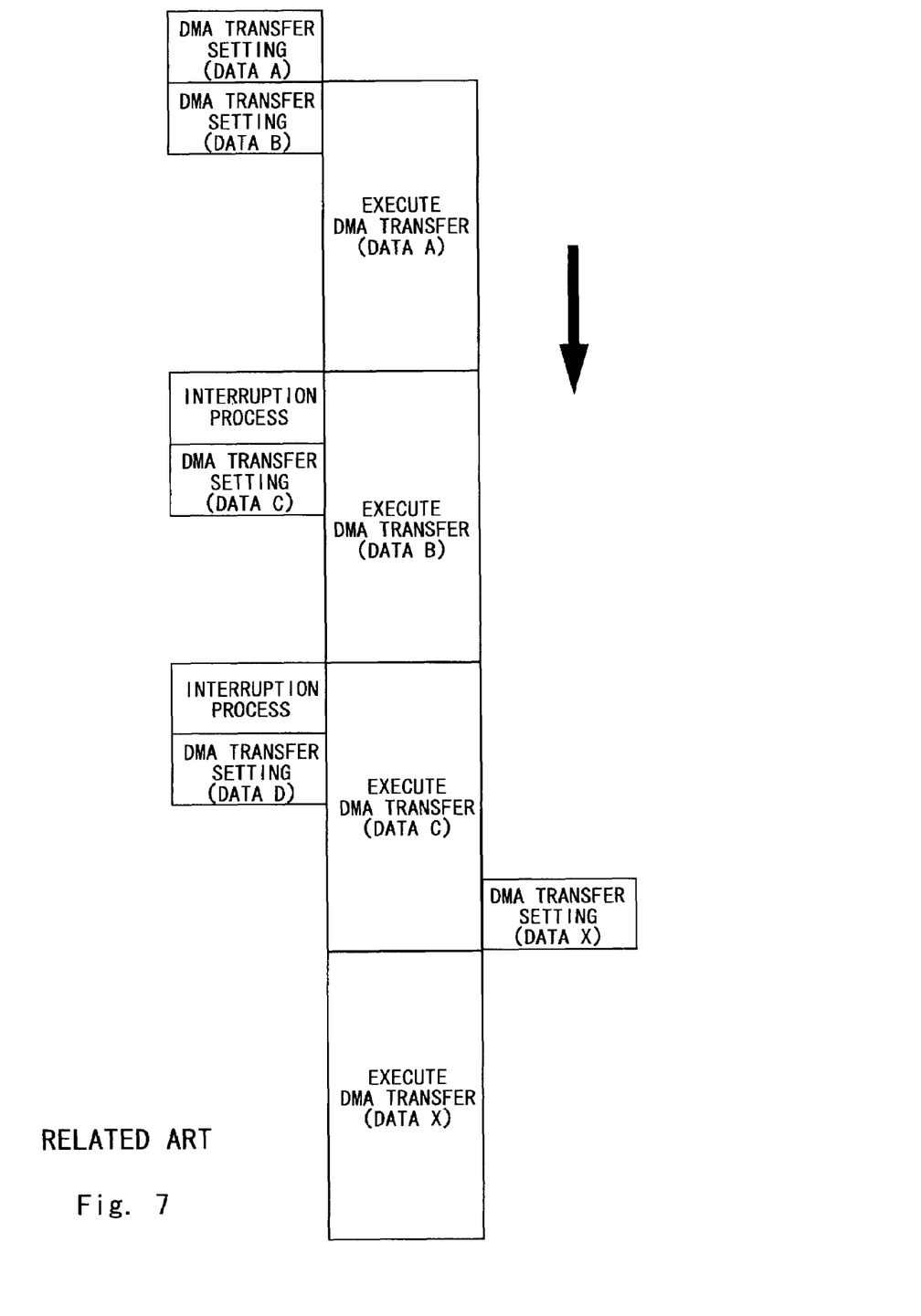
FIG. 7 is a timing chart showing a flow of another operation example of a conventional DMAC.

A process flow of the configuration of a DMA transfer setting using two registers is considered hereinafter with reference to FIG. 7. As with FIG. 6, FIG. 7 is a timing chart showing an operation flow of CPU and DMAC, where the direction indicated by the arrow in the drawing indicates the time axis of the process. Further, "DMA transfer setting" and "interruption process" are performed by CPU and "DMA transfer setting" is performed by DMAC.

As shown in the drawing, when a DMA transfer request for data B is generated during a DMA transfer for data B, a DMA transfer setting for the data B is stored to the second setting register. Further, after completing the DMA transfer for the data A, a DMA transfer setting for the data B that is stored in the second setting register is overwritten to the first setting register, and a DMA transfer for the data B is carried out. Likewise, when a DMA transfer request for data C is generated while transferring the data B, a DMA transfer setting for the data C is stored in the second setting register so as to carry out the DMA transfer for the data C after completing the DMA transfer for the data B.

However, if a DMA transfer request for data X is generated during the DMA transfer for the data C and also the DMA transfer setting for data D is already stored to the second setting register, a DMA transfer setting for the new data X may be overwritten before starting the DMA transfer for the data D in the second setting register. As a result, it has now been discovered that the DMA transfer for the data X is carried out but not the DMA transfer for the data D.

SUMMARY

According to an aspect of the present invention, there is provided a direct memory access (DMA) controller to control a data transfer from a transfer source address to a transfer destination address. The DMA controller includes a first transfer setting register to store a setting value for one of three setting items, the setting items being the transfer source address, the transfer destination address and a transfer count, a second transfer setting register to store a setting value for the setting item corresponding to the setting value stored in the first transfer setting register, the setting value being transferred to the first transfer setting register and a flag to control writing to the second transfer setting register.

According to such DMA controller, setting for a DMA transfer can definitely be stored.

Further, an embodiment of the present invention is effective to a method and system replaced with the abovementioned DMA controller.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1:
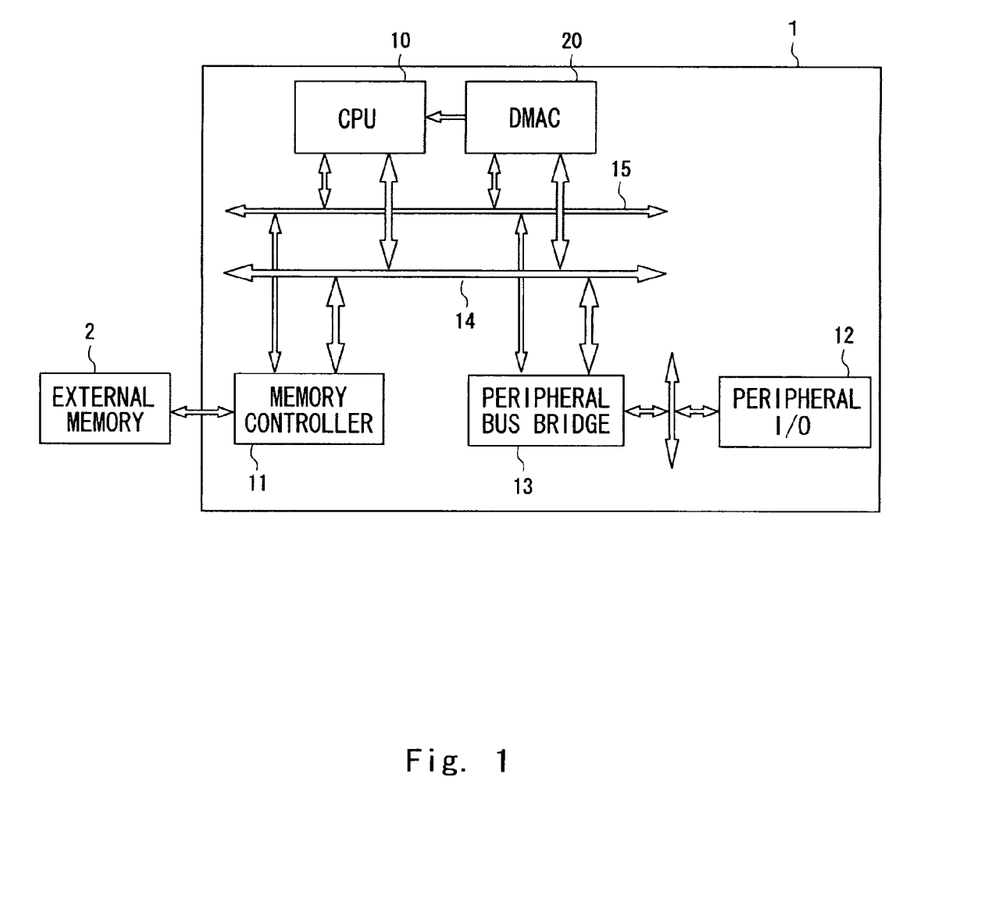
FIG. 1 is a block diagram showing an information processing apparatus according to an embodiment of the present invention.

FIG. 1 is a block diagram showing a block diagram showing an information processing apparatus 1 using a direct memory access controller (hereinafter referred to as "DMAC") according to the present invention. The information processing apparatus 1 includes a CPU 10, memory controller 11, peripheral I/O 12 and DMAC 20 etc. The memory controller 11 controls accesses from the information processing apparatus 1 to an external memory 2 that is constituted of a semiconductor memory such as RAM (Random Access Memory) The peripheral I/O 12 is composed of a serial interface, timer/counter and A/D converter or the like and communicates with the CPU 10 and accesses to the external memory 2 via a peripheral bus bridge 12. The DMA 20 controls DMA data transfer between the external memory 2 and peripheral I/O 12.

The CPU 10, memory controller 11, peripheral I/O 12 and DMAC 20 are connected by a system bus 14 and peripheral bus 15. An access from the CPU 10 to external memory 2 for example is made through the system bus 14 and memory controller 11. Further, an access from the CPU 10 to serial interface (embedded in the peripheral I/O) 12 is made through the system bus 14 and peripheral bus bridge 13. Furthermore, a DMA transfer between the peripheral I/O 12 and external memory 2 by the control of the DMAC 20 is made through the memory controller 11, system bus 14 and peripheral bus bridge 13. On the other hand, a DMA transfer setting from the CPU 10 to DMAC 20 is configured through the peripheral bus 15.

Figure 2:
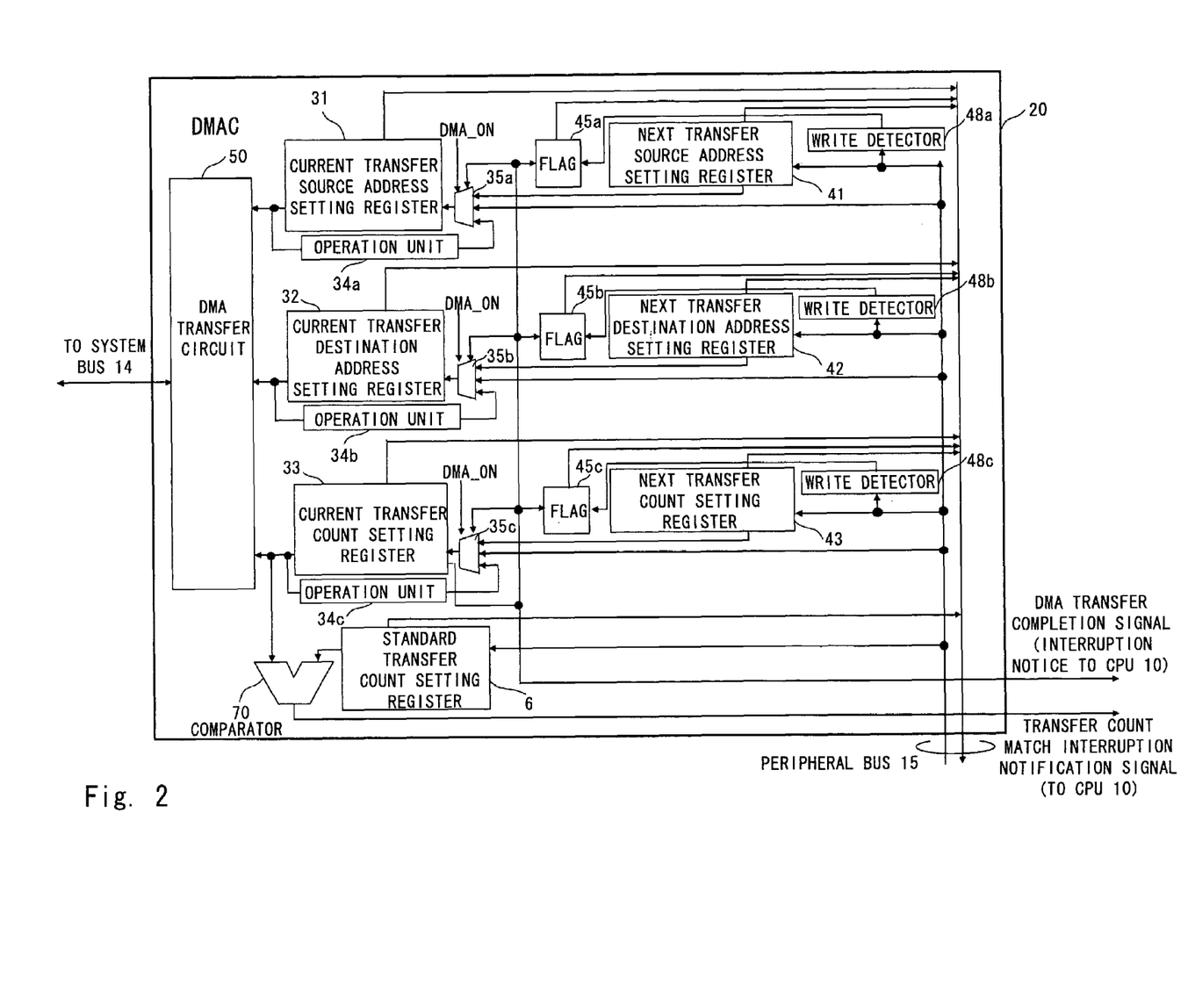
FIG. 2 is a block diagram showing a DMAC in the information processing apparatus of FIG. 1.

FIG. 2 is a view showing the configuration of the DMAC 20 in the information processing apparatus 1 shown in FIG. 1. Hereinafter, the DMAC 20 is described in detail with reference to FIGS. 1 and 2. The DMAC 20 includes three current transfer setting registers (a current transfer source address setting register 31 for storing a source address of transfer, a current transfer destination address setting register 32 for storing a destination address of transfer and a current transfer counter setting register 33 for storing a transfer count), three next transfer setting registers (a next transfer source address setting register 41 for storing a next source address of transfer, a next transfer destination address setting register 42 for storing a next destination address of transfer and a next transfer count setting register for storing a next transfer count) that store a setting for a DMA transfer carried out after a current DMA transfer (the setting hereinafter referred to as a next transfer setting), a DMA transfer circuit 50 for controlling DMA transfers according to the current transfer setting, a standard transfer count setting register 60 and a comparator 70. For each of the current transfer setting registers, one operation unit (which are operation units 34a, 34b and 34c) and one selector (which are selectors 35a, 35b and 35c) are provided. For each of the next transfer setting registers, one flag (flags 45a, 45b and 45c) and one write detector (which are write detectors 48a, 48b and 48c) are provided.

The DMA transfer circuit 50 controls DMA transfers of data between, for example, the external memory 2 and peripheral I/O 12 according to a current transfer setting stored in the three current transfer setting registers. The current transfer setting to each current transfer setting register is configured directly by the CPU 10 when the current transfer setting register and next transfer setting register are clear (for example in a period between system reset and a generation of a first DMA transfer request). On the other hand, if DMA transfer setting is already configured in the current transfer setting registers, after completing the DMA transfer by the current transfer setting, each of the DMA transfer settings stored in relative next transfer setting registers are transferred to the three current transfer setting registers.

A next transfer setting to each of the next transfer setting registers is configured by the CPU 10 when the current transfer setting are already configured to the current transfer setting registers.

The operation unit 34c decrements a current transfer count that is stored in the current transfer count setting register 33 for every transfer. The current transfer count setting register 33 outputs a DMA transfer completion signal when the current transfer count stored therein reaches 0, judging the DMA transfer by the current transfer setting is completed. Note that at this time, the DMA transfer completion signal is also output as an interruption notification signal of a DMA transfer completion to the CPU 10.

A DMA_ON signal shown in FIG. 2 is a signal that becomes active state during a DMA transfer by the current transfer setting.

In each selector, during a DMA transfer (that is when the DMA_ON signal is active state), an output from relative operation unit is selected and input to a relative current transfer setting registers. Further, when the DMA completion signal is output from the current transfer count setting register 33, an output from a relative next transfer setting register (which is the next transfer setting) is selected and input to a relative current transfer setting register.

Further as described in the foregoing, to directly write a setting to the current transfer setting registers by the CPU 10 when each of the current transfer setting registers and next transfer setting registers are clear, data to be written is selected in each selector and input to the current transfer setting register. This enables to write data from the peripheral bus 15.

As set forth above, by providing the current transfer setting registers and next transfer setting registers, a next transfer setting can be stored to the next transfer setting register even while executing a DMA transfer by a current transfer setting. Thus it is possible to suppress from deteriorating transfer efficiency caused by configuring a next setting after completing a current DMA transfer.

In the information processing apparatus 1 of this embodiment, flags (flags 45a, 45b and 45c) for controlling to write to the next transfer setting registers are provided to each of the next transfer setting registers. Each flag is 1 bit, for example, in which 0 means "write enable" and 1 means "write disable" to indicate corresponding next transfer setting register is in write enable or disable state.

Write detectors (write detectors 48a, 48b and 48c) for detecting a writing to each of the next transfer setting registers are provided in the registers. Each of the write detectors generates a set signal when detecting a writing to the relative next transfer setting register.

Each flag is set by the set signal generated by the write detector and to indicate that the next transfer setting register is in write disable state.

Further, each flag is cleared by the DMA transfer completion signal output to indicate that the next transfer setting register is in write enable state.

Content of each flag can be read out from the CPU 10. The CPU 10 refers to the content of the flag when attempting to write a next transfer setting to the next transfer setting registers and writes the next transfer setting only if the flag is cleared.

Specifically in a conventional technique, if not known that the next transfer setting stored in the next transfer setting registers is transferred to the current transfer setting registers or not, there is a risk that the next transfer setting stored in the next transfer setting registers is overwritten by the CPU 10 and a DMA transfer by the next transfer setting already configured may not be performed. On the other hand in this embodiment, by providing the flags to control to write to the next transfer setting registers so that the next transfer setting registers are set to write disable state when the next transfer setting stored in the next transfer setting register is not transferred to the current transfer setting registers yet, the safety of the next transfer setting configured to the next transfer setting register improved.

Next, the standard transfer count setting register 60 and comparator 70 are described hereinafter in detail. The standard transfer count setting register 60 stores a transfer count to be standard (hereinafter referred to as a standard transfer count). The standard transfer count can be specified by the CPU 10 and desirably specified to a value of 1 or more.

The comparator 70 compares the standard transfer count stored in the standard transfer count setting register 60 with the current transfer count stored in the current transfer count setting register 33, and when the standard transfer count matches the current transfer count, an interruption notification signal indicating the match of the transfer count is output to the CPU 10.

On the reception of the interruption notification signal, the CPU 10 prepares to write to the next transfer setting registers.

As described in the foregoing, when the DMA transfer by the current transfer setting is completed, content of the next transfer setting registers is transferred to the current transfer setting registers. By setting the standard transfer count to a value indicating "current DMA transfer nearly ends", a timing that an interruption signal is generated from the comparator 70 indicates "DMA transfer by current transfer setting nearly ends", thus the CPU 10 is able to efficiently configure the next transfer setting.

Note that the value indicating "current DMA transfer nearly ends" may be determined in consideration over processing time that the CPU 10 configures to the next transfer setting registers by the interruption signal generated from the comparator 70.

If the next transfer setting is already configured to the next transfer setting register, by generating a timing to configure the next transfer setting and notify to the CPU 10, processing resource of the CPU 10 can be used only when necessary. Thus not only improving transfer efficiency but the CPU resource can efficiently be used. Specifically, without a function to notify an interruption to the CPU 10 from the comparator 70, if the next transfer setting registers are in write disable state, the CPU 10 must monitor whether the next transfer setting registers become write enable state by polling or the like so as to configure the next transfer setting, thereby generating too much load for the CPU 10. On the other hand, by the CPU 10 configuring the next transfer setting when an interruption is generated from the comparator 70, the resource of the CPU 10 can efficiently be utilized as the CPU 10 does not need to monitor the status of DMA transfers and is able to use its resource to other processes until an interruption is generated.

This configuration is effective in a DMA transfer for variable data. Conventionally to carry out a DMA transfer for variable data, complicated software or dedicated hardware is required to configure a transfer count or the like. By the standard transfer count setting register 60 and comparator 70 of this embodiment, DMA transfers for variable data can easily be carried out.

Figure 3:
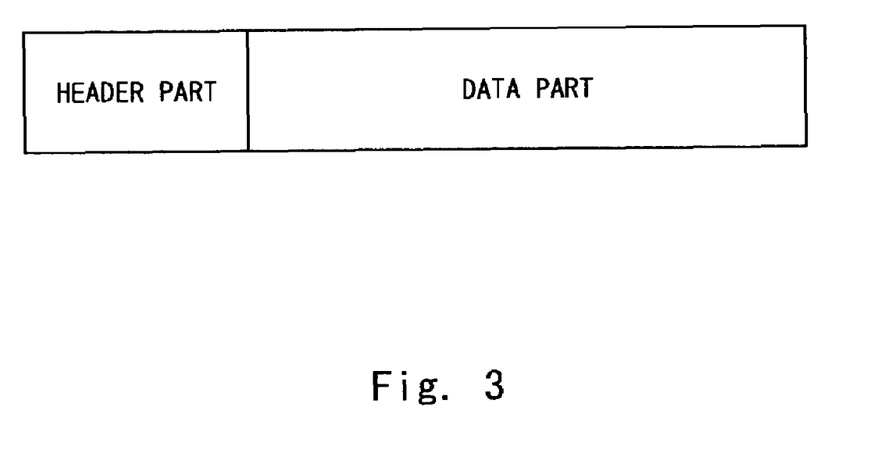
FIG. 3 is a view showing a configuration example of transferred data.

As shown in FIG. 3, data is composed of a header and data parts and transferred from the header part. Usually in a header part of variable data, information indicating the size of the data (hereinafter referred to as size information) is included.

Thus to carry out a DMA transfer for variable data, the CPU 10 firstly configures to perform a DMA transfer for the header part. Note that at this time, if the current transfer register is clear, the setting is configured to the current transfer setting registers whereas if the current transfer setting register is not clear, the setting is configured to the next transfer setting registers. Further, a count necessary for a region of the size information included in the header part to be transferred is configured to the standard transfer count register 60.

When the DMA transfer for the header part is started and the region of the size information is transferred, an interruption signal is generated from the comparator 70. The CPU 10 reads out the size information from the header part transferred by DMA in an interruption routine, calculates the transfer count for the data part according to the size information along with configuring the calculated transfer count to the next transfer count setting register 43 as a transfer count for a next transfer. By this operation, the data part is transferred following the completion of the DMA transfer for the header part.

In this way, a DMA transfer for variable data can easily be carried out without using complicated software or dedicated hardware.

Figure 4:
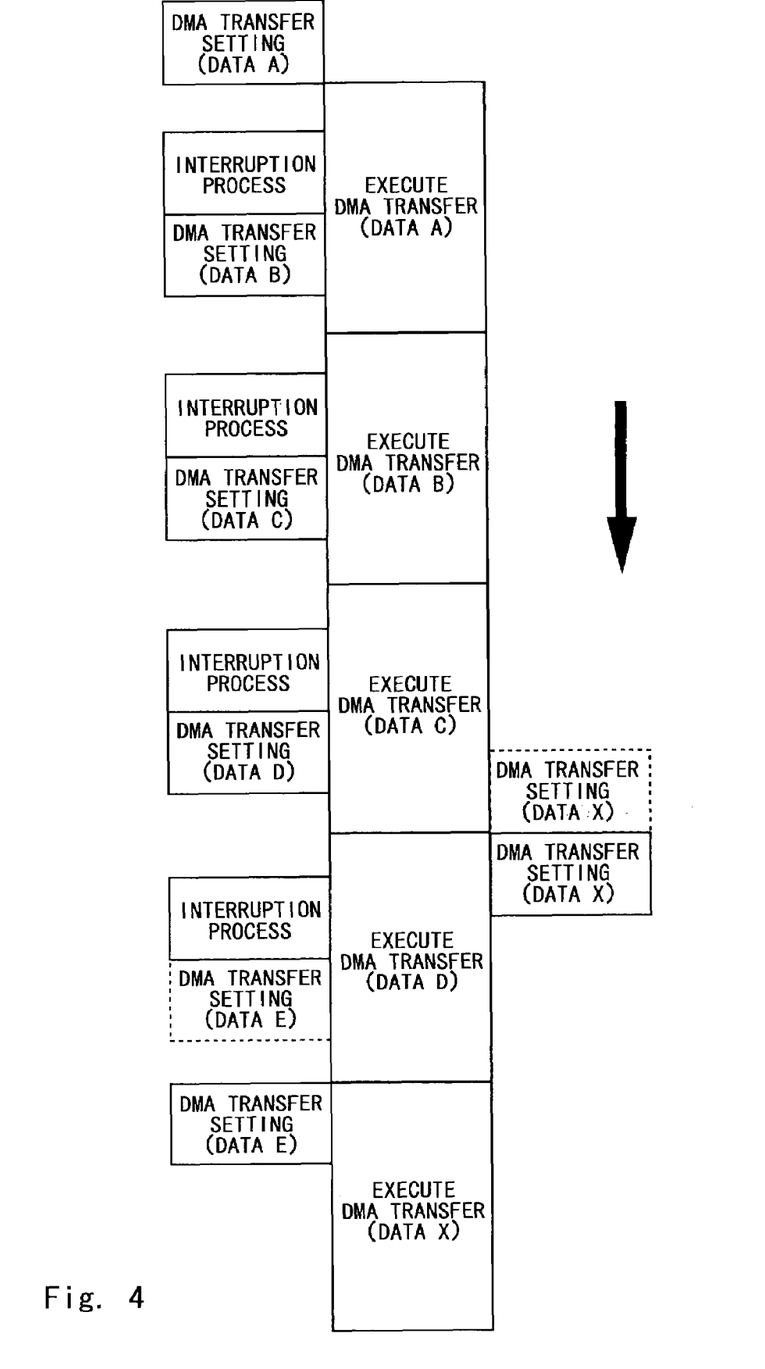
FIG. 4 is a timing chart showing an operation example of the DMAC of FIG. 2.

FIG. 4 is a timing chart showing an operation example of the CPU 10 and DMAC 20 in a DMA transfer, where the direction indicated by the arrow refers to the time axis of the process. Further, "DMA transfer setting" and "interruption process" are performed by the CPU 10 and "DMA transfer setting" is performed by the DMAC 20. Note that each of the current transfer setting registers and next transfer setting registers are not configured with DMA setting as an initial state.

Firstly when a transfer request for data A is generated to the CPU 10, a transfer source address, transfer destination address and transfer count are configured to the current transfer setting registers as a current transfer setting according to the content of the transfer request. Further, a DMA transfer for data A is carried out according to a current transfer setting stored in the current transfer setting registers.

When an interruption is generated for the CPU 10 during the DMA transfer for the data A and a DMA transfer request for data B is generated, each of the next transfer setting register is clear and each of the flags indicate write enable state. Accordingly a DMA transfer setting for the data B is configured to the next transfer setting registers as a next transfer setting by the CPU 10. At this time, the flags are updated to indicate write disable.

When the DMA transfer for the data A is completed, the next transfer setting stored in the next transfer setting register is transferred to the current transfer setting registers and a DMA transfer for the data B is carried out. Further, each of the flags is cleared.

When a DMA transfer request for data C is generated to the CPU 10 during the DMA transfer of the data B, a setting is stored to the next transfer setting registers as a next transfer setting as described in the foregoing, and when a DMA transfer request for data D is generated during the DMA transfer of the data C, a setting is stored to the next transfer setting registers as a next transfer setting. Here, during the DMA transfer for the data C, also after configuring the next transfer setting for the data D and further a DMA transfer request for data X is generated, the flag is set because a DMA transfer setting is already configured to the next transfer setting registers. Therefore, the CPU 10 will not write the DMA transfer setting for the data X to the next transfer setting registers so as to prevent from transferring the data D that is configured to the next transfer setting registers, thereby improving the safety of next transfer setting.

Then after completing the DMA transfer for the data C, the DMA transfer setting for the data D that is stored in the next transfer setting registers is transferred to the current transfer setting registers. After starting the DMA transfer for the data D, an interruption is generated from the comparator 70 to the CPU 10 and the DMA transfer setting for the data X is configured by the CPU 10. Note that as each of the flags is cleared after transferring the next transfer setting for the data D to the current transfer setting registers, the DMA transfer setting for the data X can be written to the next transfer setting registers.

Thus the CPU 10 does not need to monitor the flags and is able to perform other processes until an interruption is generated from the comparator 70. Therefore, the resource of the CPU 10 can efficiently be utilized.

Having thus described the present invention by reference to certain of its preferred embodiments, it is noted that the embodiments disclosed are illustrative and that a wide range of variations, modifications, changes, and substitutions are contemplated in the foregoing disclosure without departing from the scope and spirit of the invention. Many such variations and modifications may be considered desirable by those skilled in the art based upon a review of the foregoing description of preferred embodiments.

Figure 5:
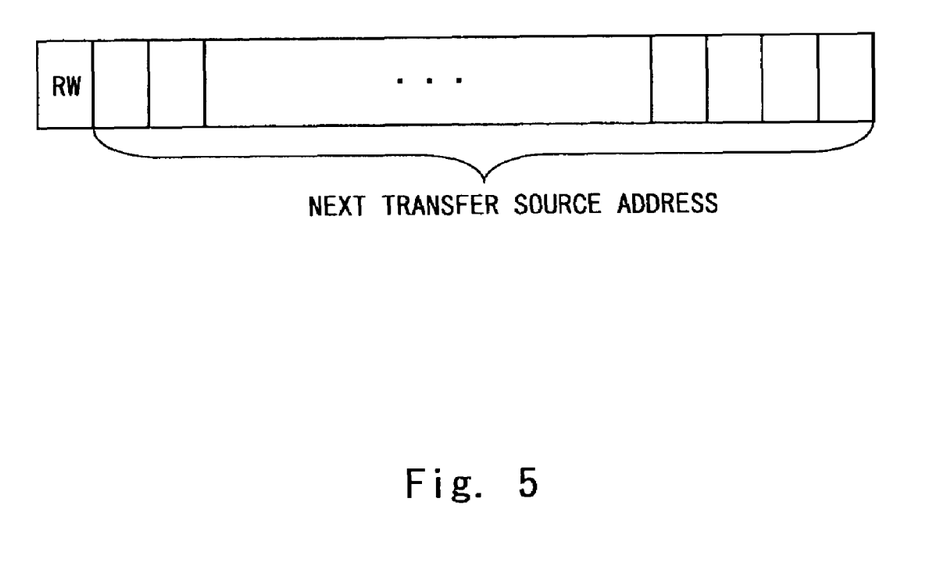
FIG. 5 is a schematic diagram showing another configuration example of a flag.

For example in the DMAC 20 shown in FIG. 2, the flag is provided separately to each of the next transfer setting registers, however the flag may be provided inside the next transfer setting register as an upper bit, for example. FIG. 5 is a view showing an example of a schematic configuration of the next transfer setting registers in such case. It should be noted that in the drawing, only the next transfer source address setting registers are illustrated and illustration and detailed explanation of the schematic configurations for the next transfer source address setting register and next transfer count setting register are omitted as they are same as that of the next transfer setting registers.

As shown in FIG. 5, in this case, the next transfer source address setting register includes a plurality (16 for example) of bits indicating the next source address as well as 1 bit (RW in FIG. 5) for controlling to write.

RW is set by a set signal generated by the write detectors so as to indicate that the next transfer source address setting registers are in write disable state.

Further, RW is cleared by a DMA transfer completion signal output from the current transfer count setting register 33 so as to indicate that the next transfer source address setting registers are in write enable state.

The CPU 10 refers to a RW, an upper bit, when attempting to write the next transfer setting to the next transfer setting registers and writes the next transfer setting only when the bit is clear. Thus an equivalent advantageous effect as in the configuration of FIG. 2 can be achieved.

Moreover in the DMAC 20 of FIG. 2, the flag is set by the set signal generated when the write detector detects a writing to the next transfer setting registers, however the value of the flag may be updated at a writing to the next transfer setting registers by the CPU 10.

Further in the information processing apparatus 1 shown in FIG. 1, the flags are provided to each of the registers 41 to 43 which are to be the next transfer setting registers. However only one flag may be provided for all the next transfer setting registers to indicate that they are in write enable or disable state. At this time, the flag may be provided separately or one of the registers 41 to 43.

Furthermore in FIG. 2, the DMAC 20 having both of the flag and comparator 70 is explained as an example, however either of the flag or comparator 70 may be provided to the DMAC 20 as they both are capable of maintaining the safety of the next transfer setting already configured to the next transfer setting registers.

A direct memory access controller having only the comparator 70 includes a comparator for comparing a standard transfer count stored in the standard transfer count setting register with a current transfer count stored in the current transfer setting registers during a DMA transfer by the current transfer setting registers, next transfer setting registers, standard transfer count setting register and a current transfer setting stored in the current transfer setting registers. The comparator generates an interruption to write a next transfer setting to the next transfer setting registers when the standard transfer count matches the current transfer count. In an information processing apparatus using such direct memory access controller, by storing a value indicating "current DMA transfer nearly ends" to the standard transfer count setting register, the next transfer setting already configured to the next transfer setting registers can be secured. Moreover, by a CPU starting to prepare for configuring the next transfer setting to the next transfer setting registers when receiving an interruption from the comparator, an efficiency of the entire apparatus can be improved.

It is apparent that the present invention is not limited to the above embodiment but may be modified and changed without departing from the scope and spirit of the invention.

What is claimed is:

1. A direct memory access (DMA) controller to control a data transfer from a transfer source address to a transfer destination address, the DMA controller comprising:
    a first transfer setting register to store a setting value for one of three setting items, the setting items being the transfer source address, the transfer destination address and a transfer count;
    a second transfer setting register to store a setting value for the setting item corresponding to the setting value stored in the first transfer setting register, the setting value being transferred to the first transfer setting register; and
    a flag to control writing to the second transfer setting register.

2. The DMA controller according to claim 1, further comprising:
    a write detector to detect a writing to the second transfer setting register,
    wherein at a detection of a writing to the second transfer setting register by the write detector, the flag is set to a state indicating a write disable.

3. The DMA controller according to claim 1, wherein the flag can be set to a state indicating the write disable by a CPU.

4. The DMA controller according to claim 1, wherein the flag is set to a state indicating a write enable at a completion of a DMA transfer according to the setting value stored in the first transfer setting register.

5. The DMA controller according to claim 2, wherein the flag is set to a state indicating a write enable at a completion of a DMA transfer according to the setting value stored in the first transfer setting register.

6. The DMA controller according to claim 3, wherein the flag is set to a state indicating a write enable at a completion of a DMA transfer according to the setting value stored in the first transfer setting register.

7. The DMA controller according to claim 1, wherein the flag is constituted as a part of the second transfer setting register.

8. The DMA controller according to claim 2, wherein the flag is constituted as a part of the second transfer setting register.

9. The DMA controller according to claim 3, wherein the flag is constituted as a part of the second transfer setting register.

10. The DMA controller according to claim 4, wherein the flag is constituted as a part of the second transfer setting register.

11. The DMA controller according to claim 5, wherein the flag is constituted as a part of the second transfer setting register.

12. The DMA controller according to claim 6, wherein the flag is constituted as a part of the second transfer setting register.

13. The DMA controller according to claim 1, further comprising:
a standard transfer count setting register to store a transfer count to be a standard of a comparison; and
a comparator to compare a transfer count decremented along with a progress of a DMA transfer according to a setting value with the transfer count stored in the standard transfer count setting register, the setting value being stored to the first transfer setting register
wherein the comparator generates an interruption at an indication of a match in the comparison.

14. The DMA controller according to claim 2, further comprising:
a standard transfer count setting register to store a transfer count to be a standard of a comparison; and
a comparator to compare a transfer count decremented along with a progress of a DMA transfer according to a setting value with the transfer count stored in the standard transfer count setting register, the setting value being stored to the first transfer setting register
wherein the comparator generates an interruption at an indication of a match in the comparison.

15. The DMA controller according to claim 3, further comprising:
a standard transfer count setting register to store a transfer count to be a standard of a comparison; and
a comparator to compare a transfer count decremented along with a progress of a DMA transfer according to a setting value with the transfer count stored in the standard transfer count setting register, the setting value being stored to the first transfer setting register
wherein the comparator generates an interruption at an indication of a match in the comparison.

16. The DMA controller according to claim 4, further comprising:
a standard transfer count setting register to store a transfer count to be a standard of a comparison; and
a comparator to compare a transfer count decremented along with a progress of a DMA transfer according to a setting value with the transfer count stored in the standard transfer count setting register, the setting value being stored to the first transfer setting register
wherein the comparator generates an interruption at an indication of a match in the comparison.

17. The DMA controller according to claim 5, further comprising:
a standard transfer count setting register to store a transfer count to be a standard of a comparison; and
a comparator to compare a transfer count decremented along with a progress of a DMA transfer according to a setting value with the transfer count stored in the standard transfer count setting register, the setting value being stored to the first transfer setting register
wherein the comparator generates an interruption at an indication of a match in the comparison.

18. The DMA controller according to claim 6, further comprising:
a standard transfer count setting register to store a transfer count to be a standard of a comparison; and
a comparator to compare a transfer count decremented along with a progress of a DMA transfer according to a setting value with the transfer count stored in the standard transfer count setting register, the setting value being stored to the first transfer setting register
wherein the comparator generates an interruption at an indication of a match in the comparison.

19. The DMA controller according to claim 7, further comprising:
a standard transfer count setting register to store a transfer count to be a standard of a comparison; and
a comparator to compare a transfer count decremented along with a progress of a DMA transfer according to a setting value with the transfer count stored in the standard transfer count setting register, the setting value being stored to the first transfer setting register
wherein the comparator generates an interruption at an indication of a match in the comparison.

20. The DMA controller according to claim 8, further comprising:
a standard transfer count setting register to store a transfer count to be a standard of a comparison; and
a comparator to compare a transfer count decremented along with a progress of a DMA transfer according to a setting value with the transfer count stored in the standard transfer count setting register, the setting value being stored to the first transfer setting register
wherein the comparator generates an interruption at an indication of a match in the comparison.

* * * * *